United States Patent [19]

Clemens et al.

[11] 4,140,659

[45] Feb. 20, 1979

[54] PREPARATION, POLYMERIZATION AND USE OF NEW BIS-VINYLBENZYL NITROGENOUS MONOMERS

[75] Inventors: David H. Clemens, Willowgrove, Pa.; Frank J. Glavis, deceased, late of Rydal, Pa., by Doris A. Glavis, legal representative

[73] Assignee: Rohm and Haas Company, Philadelphia, Pa.

[21] Appl. No.: 841,620

[22] Filed: Oct. 13, 1977

Related U.S. Application Data

[63] Continuation-in-part of Ser. No. 779,427, Mar. 21, 1977, abandoned, which is a continuation of Ser. No. 593,906, Jul. 7, 1975, abandoned.

[51] Int. Cl.$^2$ .......................... C08F 12/34; C08F 2/18
[52] U.S. Cl. ...................................... 521/38; 526/310; 526/291; 526/294; 526/295; 526/292

[58] Field of Search ...................... 260/2.2 R; 526/258, 526/259, 291, 303, 310, 297

[56] References Cited

U.S. PATENT DOCUMENTS 2,875,162  2/1959  Morris .................................. 526/310

*Primary Examiner*—Joseph L. Schofer
*Assistant Examiner*—Peter F. Kulkosky
*Attorney, Agent, or Firm*—Lester E. Johnson

[57] ABSTRACT

This invention relates to nitrogenous vinylbenzyl and bis-(vinylbenzyl) compounds for use in the preparation of polymers, especially ion exchange resins, and to processes for the preparation of the monomers and polymers. More particularly, it relates to the preparation, polymerization, and use of the new nitrogenous compounds as crosslinking agents and/or function-introducing agents.

25 Claims, No Drawings

PREPARATION, POLYMERIZATION AND USE OF NEW BIS-VINYLBENZYL NITROGENOUS MONOMERS

This is a continuation-in-part of copending application U.S. Ser. No. 779,427, now abandoned filed Mar. 21, 1977, which in turn is a continuation of application U.S. Ser. No. 593,906, filed July 7, 1975, now abandoned.

BACKGROUND OF THE INVENTION

A. Field of the Invention

This invention relates to new nitrogenous, crosslinking compounds characterized by N,N-bis-(vinylbenzyl) substitution which comprise reaction products which are prepared from a mixture of vinylbenzyl chloride with an amine, processes for preparing said compounds, and polymerizing said crosslinking compounds to obtain polymers which are useful, for example, as ion exchange resins, flocculants, thickeners, and the like. The new nitrogenous compounds are useful as monomers and as crosslinking agents and/or function-introducing agents.

B. Description of the Prior Art

Macroreticular and gel vinylbenzyl chloride polymers which possess a tertiary amine or a quaternary ammonium functionality have been prepared in the prior art by various methods as follows: (a) They may be made by first polymerizing or copolymerizing styrene and then chloromethylating the copolymer or the polymer and subsequently aminating the chloromethyl functionality. (b) A second way of making such polymers is to polymerize a mixture of vinylbenzyl chloride and divinylbenzene in a one step process. The resulting polymer is then aminated to provide a weakly, or strongly basic resin. For further details of a typical prior art process, see U.S. Pat. No. 3,637,535 and U.S. Pat. No. 3,843,566. The chloromethylation process, although widely used to provide polymers and ion exchange resins derived from such polymers, possesses inherent disadvantages. For example, the chloromethyl methyl ether (CME) which has been widely used as a chloromethylating agent to provide reactive chloro groups on the polymer is a substance of such great toxicity that its use is contraindicated. In addition, the multistage nature of the chloromethylation process of the prior art makes it inherently more expensive than the one-step process utilized to prepare the polymers of the present invention. A disadvantage of the one-step vinylbenzyl chloride (VBC) polymerization process of the prior art is that, in order to obtain weakly or strongly basic anion exchange resins, the vinylbenzyl chloride polymers must be aminated in an additional step to provide such anion exchange resins.

SUMMARY OF THE INVENTION

In one aspect, this invention comprises novel crosslinked nitrogenous poly-(vinylbenzyl) resins polymerized from a monomer system comprising from about 0.1% to 100% by weight, based on total amount of monomer, of a polymerizable bis-(vinylbenzyl) compound represented by the formula

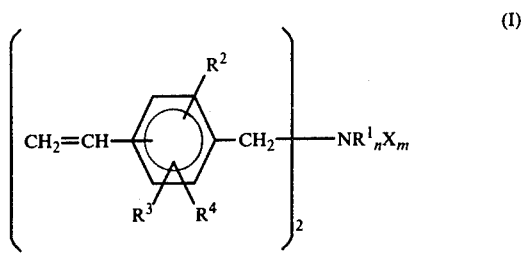

wherein:
- $R^1$ is a $C_{1-16}$ alkyl, aryl, or aralkyl radical or a hydrogen radical;
- $R^2$, $R^3$ and $R^4$ independently represent $C_{1-16}$ saturated or unsaturated hydrocarbyl, halogen, nitro, hydroxy, alkoxy, amino, or hydrogen radicals;
- n is 1 or 2 wherein, if n is 2, each $R^1$ is independently selected;
- X is an anion; and
- m is 0 or 1 when n is 1 and 2, respectively.

In another aspect, this invention comprises a process for preparing the resins of the invention.

In still another aspect, this invention comprises crosslinking and/or function-introducing nitrogenous bis-(vinylbenzyl) compounds represented by the formula

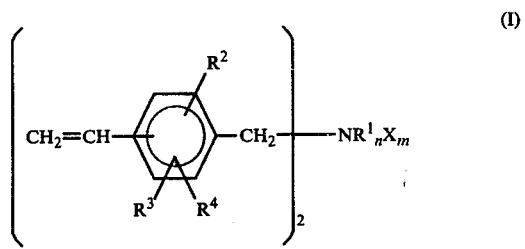

wherein $R^1$, $R^2$, $R^3$, $R^4$, n, X and m are as defined hereinabove.

In yet another aspect, this invention comprises a process for preparing the nitrogenous bis-(vinylbenzyl) compounds of the invention.

In still another aspect, this invention comprises a process for preparing the polymerizable quaternary ammonium hydroxide compound, vinylbenzyl(trimethyl)ammonium hydroxide.

The resins of this invention may have either a macroreticular or a gel polymeric backbone having chemically bonded thereto tertiary amine or quaternary ammonium functional groups derived from the monomers from which the resins are prepared. In one preferred embodiment, the resins of the invention comprise macroreticular or gel resins comprising a homopolymer polymerized from a monomer mixture of 100% by weight, based on total monomer mixture, of a polymerizable bis-(vinylbenzyl) compound represented by formula I described hereinabove. In another preferred embodiment, the resins of this invention comprise macroreticular or gel resins comprising a copolymer polymerized from a monomer mixture of (1) from about 0.1% to about 99.9% by weight, based on total monomer mixture, of a polymerizable bis-(vinylbenzyl) compound represented by formula I described hereinabove and (2) from about 99.9% to about 0.1% by weight, based on total monomer mixture, of a copolymerizable monoethylenically unsaturated compound. When the resins of this invention comprise copolymers, a more preferred embodiment comprises macroreticular or gel resins comprising a copolymer polymerized from a monomer mixture of (1) from about 4% to about 70% by weight, based on total monomer mixture, of a polymerizable bis-(vinylbenzyl) compound represented by formula I described hereinabove and (2) from about 96% to about 30% by weight, based on total monomer mixture, of a copolymerizable monoethylenically unsaturated compound. When the resins of the invention comprise copolymers, a most preferred embodiment comprises macroreticular or gel resins comprising a copolymer polymerized from a monomer mixture of (1) from about 4% to about 15% by weight, based on total monomer mixture, of a polymerizable bis-(vinylbenzyl) copmpound represented by formula I described hereinabove and (2) from about 96% to about 85% by weight, based on total monomer mixture, of a copolymerizable monoethylenically unsaturated compound.

The N,N-bis(vinylbenzyl) substituted compounds of this invention represented by the formula

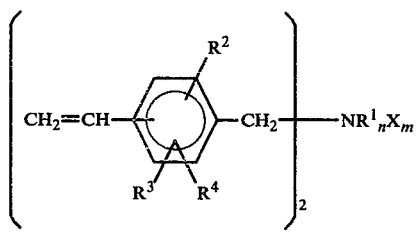

(I)

wherein $R^1$, $R^2$, $R^3$, $R^4$, n, X and m are as defined hereinabove, may be unsubstituted or substituted on either the benzene nucleus of the vinylbenzyl group or the amine nitrogen atom of the monomer, or both. One, or both, of the vinylbenzyl groups may contain up to 3 substituents selected from the group which consists of $C_{1-16}$ alkyl, halogen, nitro, hydroxy, alkoxy, or amino. For example, the vinylbenzyl moiety may be substituted with alkyl such as methyl, ethyl, decyl, hexadecyl, isopropyl, isooctyl, allyl, hexenyl, and the like; halo such as chloro, bromo; alkoxy such as methoxy, ethoxy, benzyloxy; and amino such as primary amino monoalkylamino, such as monomethylamino, monoethylamino, dialkylamino, such as dimethylamino, diethylamino, pyrrolidino, cyclohexylamine and the like.

The nitrogen atom of the bis-(vinylbenzyl) substituted compound may be substituted to give a tertiary amine or a quaternary ammonium compound with up to two substituents selected from the group which consists of $C_{1-16}$ alkyl, aryl such as phenyl or napthyl, or aralkyl such as benzyl and the like.

Suitable monoethylenically unsaturated compounds which may be copolymerized with the N,N-bis(vinylbenzyl) substituted compounds of this invention, represented by formula I, include one or more members selected from the group consisting of vinylaromatic compounds, vinyl ethers, vinyl esters of carboxylic acids, vinyl halides, vinylidene halides, polymerizable alkenes and unsaturated carboxylic and dicarboxylic acids. Exemplary of such monoethylenically unsaturated compounds are, for example, monovinylbenzyl amines, vinylbenzyl chloride, styrene, alkyl styrenes, vinylnaphthalene, vinylpyridine, allyl ether, vinyl acetate, vinyl chloride, vinylidene chloride, ethylene, propylene, butadiene, acrylic compounds including acrylic and methacrylic acids and ester, amide, N-substituted amide, and nitrile derivatives thereof, maleic anhydride, and fumaric acid. Preferred monoethylenically unsaturated compounds which may be copolymerized with the N,N-bis-(vinylbenzyl) substituted compounds of this invention include one or more members selected from the group consisting of monovinylbenzyl amines and ammonium salts thereof, vinylbenzyl chloride, styrenes, and acrylic compounds such as, for example, ester, and nitrile, amide, and N-dialkylaminoalkyl and N-trialkylammoniumalkyl amide derivatives of acrylic and methacrylic acids.

The invention provides a one-step polymerization process which avoids the toxicity problems of the prior art and provides polymeric products which are weakly or strongly basic anion exchange resins which possess highly favorable physical stability, thermal stability, regeneration efficiency, and column capacity. Not only does the process of the invention eliminate the chloromethylation step which employs the toxic chloromethyl methyl ether reagent, it affords products which are anion exchange resins in a simplified one-step method which is also inherently more economical.

The method of preparation of the tertiary amine bis-(vinylbenzyl) compounds of this invention involves agitating mixtures of the appropriate aqueous amine, sufficient sodium hydroxide to maintain the product as the free base, and vinylbenzyl chloride over a period of several hours initially at reduced temperatures (10–20° C.) and then overnight at ambient temperature.

The method of preparation of the quaternary ammonium bis-(vinylbenzyl) compounds of this invention involves agitating either aqueous or organic solvent (for example, acetone:diethyl ketone, 1:1 vol. or methanol mixtures of the appropriate amine and vinylbenzyl chloride at ambient temperature or at temperatures elevated sufficiently (usually between 30–40° C.) to achieve reactivity. At the end of the period of agitation, phase separation is effected and the respective monomer products are isolated and characterized according to customary analytical methods known to those of ordinary skill in the art.

In making the gel polymers, the preferred polymerization technique is "suspension polymerization" wherein the comonomer mixture is dispersed by means of a dispersant additive and agitated in a buffered aqueous phase in the presence of a free radical catalyst and then heated sufficiently to effect reactivity. At the end of the reaction period, the batch is cooled to ambient temperature, the resulting solid product is collected and washed with water until the effluent is clear.

As is known in the art, macroreticular polymers are prepared by a process which involves the presence of from 10 to 70% of a phase extender (or precipitant) which is a liquid which (a) acts as a solvent for the monomer mixture and is chemically inert under the polymerization conditions and (b) is present in such amounts and exerts so little solvating action on the crosslinked copolymer that phase separation of the product takes place. The general theory is that, when suspension polymerization is used, the precipitant must either be immiscible or only partially miscible with the suspending medium. Alkanols with a carbon content of from 4 to 10 will suffice as precipitants when used in the range of from 10 to 80% of total polymer mixture. A preferred precipitant is methyl isobutyl carbinol (MIBC) used preferably in the range of from 30 to 50%.

Catalysts which generates free radicals which, in turn, function as reaction initiators include the widely known compounds of the peroxide and azo classes. Preferred catalysts which are employed in the processes of this invention include, for example, t-butyl peroctoate and t-butyl hydroperoxide in the range of from 0.01% to 3% by weight of the monomer mixture.

Additives which will effect dispersion of the monomer mix in an aqueous system as taught by this invention include the ammonium salt of a styrene maleic anhydride copolymer, carboxymethyl cellulose, bentonite, polyvinylimidazole, or poly(diallyldimethylammonium chloride). Preferred dispersants used in this invention include poly(diallyldimethylammonium chloride) and ammonium sulfate.

The following examples are illustrative of the present invention but are not to be construed as limting in scope. All parts and percentages throughout the specification and claims are by weight unless otherwise indicated.

EXAMPLE I

Preparation of Vinylbenzyl Dimethylamine 676 grams (6.0 moles) of 40% aqueous dimethylamine, 150 grams of distilled water, and 144 grams (3.54 moles) of 98.2% sodium hydroxide pellets are mixed and cooled to 15° C. At this temperature, 486 grams (3.0 moles) of 98% vinylbenzyl chloride is added at a uniform rate over a period of five hours with agitation. The batch is then allowed to warm to ambient temperature (26° C.) and agitated at ambient temperature overnight. On stopping agitation, phase separation is obtained. The lower aqueous layer of 990 grams is withdrawn and discarded. A middle layer of 80 grams, which contains a mixture of starting materials and a quaternary amine product, bis-vinylbenzyl dimethylammonium chloride or hydroxide, is obtained. The top product layer is treated with activated charcoal and calcium chloride and then filtered to prove 365 grams of product, whose structure is confirmed by NMR and IR analyses and by the failure to form any complex with methyl orange. Other analyses yield the following data which further supports the given assignment of structure:

| me per gram | 6.10 (theory 6.21) |
|---|---|
| Nitrogen | 9.20% (theory 8.8%) |
| Chlorine | 0.59% (theory 0%; probably occluded) |
| Water | 0.2% |

EXAMPLE II

Preparation of Bis-(vinylbenzyl) Monomethylamine 20 grams (0.5 mole) of 98.2% sodium hydroxide pellets are dissolved, with stirring and cooling to a temperature maintained at 10° C., in a saturated solution of monomethylamine (large excess greater than one mole), which is prepared by bubbling gaseous monomethylamine into 200 ml. of distilled water at 10° C. until saturated. Then, 77.8 grams (0.5 mole) of 98% vinylbenzyl chloride are added at a uniform rate over a period of 30 minutes while maintaining the batch temperature below 20° C. Upon removing external cooling, the batch temperature rises to 32° C. in one hour as a result of an exotherm. The batch is then agitated at ambient temperature (26° C.) overnight. On stopping agitation, the phases cleanly separate within a period of one hour. The lower aqueous layer of 250 grams is withdrawn and discarded. The upper product layer of 50 grams is washed with three successive 100 ml. portions of water adjusted to a pH of 8.9, followed by one 100 ml. portion of distilled water (neutral pH). (Without the pH adjustment of the initial three wash portions, some foaming and emulsification occurs.) The washed product layer is then dried over calcium chloride and anhydrous sodium sulfate. Upon removing the drying agent, 38 grams of product is obtained. Analyses showed this material to have the following properties:

| Water | 0.24% | |
|---|---|---|
| Nitrogen | 5.9% | (theory 5.3%) |
| Chlorine | 0.80% | |

EXAMPLE III

Preparation of Vinylbenzyltrimethylammonium Chloride (a) Aqueous Method 169 grams (1.11 mole) of 98% vinylbenzyl chloride is mixed with 326 grams (1.38 mole) of 25% aqueous trimethylamine at 30 – 32° C. over a period of four hours. (Lower temperatures fail to achieve reactivity, probably because of the immiscibility of the reagent in the solvent). Then, the excess trimethylamine is removed by distillation at a batch temperature of 40° C. Cooling of the resulting batch mixture to 20° C. and discontinuing stirring effect separation of phases in about one hour. (Higher temperatures disallow phase separation.) The lower aqueous layer of 28 grams is withdrawn and discarded, leaving an upper product layer of 455 grams. Analyses show this product to contain 57.3% of water and to have an ionizable chlorine content of 6.98%. Calculation of product concentration from these two results gives 42.7% and 41.7% for vinylbenzyltrimethylammonium chloride by the water and ionizable chlorine analyses, respectively. This corresponds to circa 80% product yield.

(b) Solvent Method 477 grams (3.05 mole) of 98% vinylbenzyl chloride is dissolved in 2070 ml. of acetone:diethylketone (1:1 vol). While maintaining a batch temperature of 19 – 24° C., 200 grams of trimethylamine is added to this solution over a period of six hours by bubbling the gaseous amine into the stirred, cooled solution. After stirring the resulting batch at ambient temperature (26° C.) for one hour, 1300 ml. of solvent is removed under vacuum. (This solvent mixture is saved and reused in subsequent preparations.) The resulting hydroscopic solid is dried in the reaction flask at reduced pressure and ambient temperature. 634 grams (90% yield) of resulting solid product is then carefully transferred to a tightly sealed bottle for storage to prevent water pickup.

EXAMPLE IV

Preparation of Bis-(vinylbenzyl)dimethylammonium Chloride (a) Aqueous Method 33.4 grams (0.214 mole) of 98% vinylbenzyl chloride is mixed with 125 grams of distilled water. While maintaining the batch temperature below ambient temperature by means of external cooling, 34.4 grams (0.214 mole) of vinylbenzyldimethylamine is added at a uniform rate over a period of 10 minutes. The reaction mixture is then slowly warmed to 35 – 40° C. and then maintained at that temperature for 1.5 hours, whereupon the heterogeneous mixture becomes completely miscible and clear. On cooling to 25° C. and discontinuing stirring, the mixture separates into two phases. The lower product layer of 85 grams is withdrawn. Analyses show the product to contain 38.7% water and to have an ionizable chlorine content of 6.6%. The results correspond to a product assay of 61.3% and 60% by the water and ionizable chlorine analyses, respectively. Further analyses of the product shows 3.36% of nitrogen and no titratable base. The resulting 52.1 grams of product corresponds to circa 80% yield. The 107 grams of upper layer, whose analysis shows 92.9% water, 0.83% nitrogen, and 2.14% chlorine, is discarded.

(b) Solvent Method 50 ml. of methanol, 16.7 grams (0.107 mole) of 98% vinylbenzyl chloride, and 17.2 grams (0.107 mole) of vinylbenzyldimethylamine are mixed at 34° C. This batch mixture is stirred for 15 minutes at 34° C. and then warmed to 40° C. and stirred at that temperature for an additional 15 minutes. The cooled product was found to be 46.3% in methanol. NMR analysis confirms the assigned structure of the product.

EXAMPLE V

Preparation of Vinylbenzyltrimethylammonium Hydroxide 1000 ml. of IRA-400 beads (chloride form), (0.035 cubic feet, 1.40 equivalents) are placed in a 2-inch id column. 4000 ml. of 10% sulfuric acid is passed through the column to convert the resin to the sulfate-bisulfate form. 4000 ml. of water is then passed through the column to remove excess acid, and the column is left with one bed volume (180 ml.) of water. Then, 396 grams of 50% vinvylbenzyltrimethylammonium chloride solution is passed through the column, followed by 700 ml. of chaser water. The first 300 ml. of eluate is discarded as containing no product. The following twelve cuts of effluent are conbined to give 684 ml. of product, whose benzenoid structure is detected by UV analysis. The final 200 ml. of eluate is discarded. This 684 ml. of product solution is then treated with 210 grams of lime (CaO) in two portions, allowing each mixture to stir for one hour, whereupon the lime is removed by filtration. 90 grams of sodium hydroxide pellets are then added to the filtrate with stirring while maintaining the batch temperature at 35° C. The upper layer of 280 grams is separated and treated with 200 grams of 15% sodium hydroxide solution. The product layer of 241 grams is then separated. Analysis of the product gives the following results:

| | | |
|---|---|---|
| Water | 27.9% | |
| Sulfur | 0.26% | |
| Chlorine | nil | |
| Neutral equivalent | | 193, corresponding to 66% vinylbenzyltrimethylammonium hydroxide in product layer (72.1% based on water content) |

This is a yield of 162 grams, or 90% of theory. Another preparation according to the same procedure gives the following analytical results:

| | |
|---|---|
| Water | 10.0% |
| Sulfur | 0.0% |
| Chlorine | 0.23% |
| Neutral equivalent | 275, or 95% content of vinylbenzyltrimethylammonium hydroxide |

EXAMPLE VI

Copolymerization of Vinylbenzyldimethylamine and Bis-(vinylbenzyl)monomethylamine (Gel Type)

An aqueous phase is prepared by adding the following ingredients sequentially and stirring the resulting mixture under a positive pressure of nitrogen:

| | |
|---|---|
| Tap Water | 150 ml. |
| Boric Acid | 3.3 grams |
| NaOH/50.9% in water | 1.0 ml. (This adjusts the pH to 10) |
| Poly(diallyldimethyl-ammonium chloride solution/ 16% assay | 7.8 ml. (8.0 grams) |
| Gelatin | 0.88 grams |

To the aqueous phase, in the absence of stirring and under positive pressure of nitrogen, is added a monomer mixture of 7.5 grams of bis-(vinylbenzyl)monomethylamine, 67.5 grams of anhydrous vinylbenzyldimethylamine, and 0.75 grams of t-butyl peroctoate. The resulting mixture is then agitated at 222 rpm, and the batch is heated to 80° C. and maintained at this temperature for ten hours. After this time, the batch is cooled. The resulting beads are then separated, placed in a column, and backwashed until the effluent water is clear. These beads are then analyzed to give the following data:

| | |
|---|---|
| Total Solids | 52.6% |
| Anion Exchange Capacity | 5.80 me/gram |
| Strong Base Capacity | 0.06 me/gram |
| Swelling, Acid-Base Cycling | 270% |

EXAMPLE VII

Comparative Copolymerization of Vinylbenzyldimethylamine and Divinylbenzene (Gel Type)

A copolymer prepared in the manner identical to Example VI except from a monomer mix of 92:8 vinylbenzyldimethylamine and divinylbenzene gives the following analytical results:

| | |
|---|---|
| Total Solids | 55.8% |
| Anion Exchange Capacity | 4.68 me/gram |
| Strong Base Capacity | 2.00 me/gram |
| Swelling, Acid-Base Cycling | 250% |

Note well the nominal strong base capacity of the weak base resin of this example as compared with the absence of such strong base capacity in the resin of Example VI.

EXAMPLE VIII

Homopolymerization of Bis-(vinylbenzyl)monomethylamine (Gel Type)

The effectiveness of the novel crosslinking agent is demonstrated by the following analytical results from a polymer prepared as in Example VI except from a monomer mix consisting solely of the monomer, bis-(vinylbenzyl)monomethylamine, in the presence of 1.0% of t-butyl peroctoate:

| Total Solids | 77.5% |
|---|---|
| Anion Exchange Capacity | 2.70 me/gram |
| Strong Base Capacity | 0.25 me/gram |
| Swelling, Acid-Base Cycling | 8.0% |

EXAMPLE IX

Copolymerization of Vinylbenzyltrimethylammonium Methylsulfate and Bis-(vinylbenzyl)dimethylammonium Chloride (Gel Type)

An aqueous phase is prepared by dissolving 258.6 grams of ammonium sulfate (domestic grade) in 300 grams of tap water with stirring. The reaction flask and stirred contents are then sparged with nitrogen for 15 minutes, and then the reaction flask is swept with a sufficient amount of nitrogen for the remainder of the reaction so as to maintain a positive pressure.

To the aqueous phase at 23° C., in the absence of agitation, is added a monomer phase of 70 grams of water, 35 grams of bis-(vinylbenzyl)dimethylammonium chloride, and 15 grams of vinylbenzyltrimethylammonium methylsulfate. The resulting mixture is then agitated at 180 rpm and is warmed to 32° C.

To this mixture is added an initiator phase of 2.0 ml of 70% t-butyl hydroperoxide. The resulting stirred batch is heated at a temperature of 30° C. for 16 hours. The batch temperature is then raised to 40° C. and maintained for 40 minutes, and finally raised to 95° C. over a period of 75 minutes while adding 125.5 grams of ammonium sulfate to maintain a saturated solution for the continuous phase. After heating and stirring for four hours at 95° C., the batch is cooled to ambient temperature, stirring is discontinued, and the batch is filtered to remove the resulting beads. The beads are then washed twice with 1-liter portions of water at 50° C. The beads are then placed in a column and backwashed with water until the effluent is clear. Upon air-drying overnight, these beads are analyzed to give the following results:

| Total Solids | 40.7% |
|---|---|
| Anion Exchange Capacity | 4.07 me/gram |
| Strong Base Capacity | 3.81 me/gram (This is determined by removing the chloride from the resin by treating with caustic, followed by NaCl in 0.01 N sodium hydroxide.) |

EXAMPLE X

Copolymerization of Vinylbenzyltrimethylammonium Hydroxide and Bis-(vinylbenzyl)dimethylammonium Chloride (Gel Type)

(a) Preparation of Bead Form

To an aqueous phase of 350 ml. of 50.9% sodium hydroxide is added at ambient temperature a monomer phase of 50 grams of 65.8% aqueous vinylbenzyltrimethylammonium hydroxide (32.9 grams of 100% monomer) and 15 grams of bis-(vinylbenzyl)dimethylammonium chloride. Then, agitation is started at 400 rpm and a resulting exotherm raised the batch temperature to 37° C. After 12 minutes, 0.5 ml. of 70% t-butyl hydroperoxide is added. After 6 minutes, a nitrogen sparge is started and, after another 5 minutes the batch is warmed to maintain the temperature at 35° C. Then, 0.03 grams of isoascorbic acid is added and the batch heated to 40° C. After 15 minutes, an additional 0.5 ml. of 70% t-butyl hydroperoxide is added, and the reaction mixture is stirred and heated at 40° C. overnight. Then the batch is heated to 95° C. for two hours. The aqueous phase is then siphoned-off, and the beads are washed with three 500 ml. portions of water. The swollen beads are then downwashed in a column with 5% sodium hydroxide solution and then air-dried. Analysis of the beads gives the following results:

| Chloride | 5.4% |
|---|---|
| Hydroxide form | 47.3% |
| Carbonate form | 47.3% |
| Anion Exchange Capacity | 1.46 |

(b) Preparation of Particulate Polymer

The polymerization system as in "a" above is repeated with the following monomer phase: 14,0 grams of anhydrous bis-(vinylbenzyl)dimethylammonium chloride, 36.0 grams of anhydrous vinylbenzyltrimethylammonium chloride, and 50 grams of distilled water.

After mixing the aqueous and monomer phases, the batch is stirred at 289 rpm and 1.50 ml. of 70% t-butyl hydroperoxide is added. Upon maintaining a temperature of 35° C. overnight, a particulate polymer is formed.

EXAMPLE XI

Copolymerization of Vinylbenzyldimethylamine and Bis-(vinylbenzyl)monomethylamine (Macroreticular)

An aqueous phase is prepared by adding the following ingredients sequentially and stirring the resulting mixture under a positive pressure of nitrogen:

| Tap Water | 225 ml. |
|---|---|
| Boric acid | 4.9 grams |
| NaOH/50.9% in water | 1.5 ml. |
| Poly(diallyl dimethylammonium chloride) solution/16% assay | 7.8 ml. (8.0 grams) |
| Gelatin | 1.32 grams |

To the aqueous phase, in the absence of stirring and under positive pressure of nitrogen, is added a monomer mixture of 7.5 grams of bis-(vinylbenzyl)monomethylamine, 67.5 grams of anhydrous vinylbenzyldimethylamine, 0.75 grams of t-butyl peroctoate, and 37.5 grams of methyl isobutylcarbinol (MIBC) phase extender. The resulting mixture is agitated at 215 rpm, and the batch is heated to 80° C. and maintained at this temperature for 16 hours. Water is slowly added to the mixture while MIBC is distilled out until a pot temperature of 100° C. is achieved. The batch is then cooled and the resulting beads separated, placed in a column and backwashed until the effluent is clear. The opaque beads give the following analytical data:

| Total Solids | 33.8% |
|---|---|
| Anion Exchange Capacity | 5.75 me/gram |
| Strong Base Capacity | 0.04 me/gram |

EXAMPLE XII

Copolymerization of Bis-(Vinylbenzyl)-Monomethylamine and vinylbenzyl Chloride Followed by Amination 0.1 g of gelatin is dissolved in 50 ml of water. 4.0 g of glycerine and 6.0 g boric acid are dissolved in 350 ml water and the pH is adjusted to 10.3 with 50% NaOH. The gelatin solution and 80 g of NaCl are added, and the mixture is stirred under a positive pressure of nitrogen. To the aqueous phase, in the absence of stirring and under a positive pressure of nitrogen, is added a monomer mixture of 57.0 g of bis-(vinylbenzyl)-monomethylamine, 300.0 grams of vinylbenzyl chloride, and 3.6 g of azobisisobutyronitrile. The resulting mixture is agitated at 170 rpm, and the batch is heated to 65° C. and maintained at this temperature for 4 hours. The batch is then heated at 95° C. for 1 hour, cooled, and the resulting beads separated, washed with water and dried. 164.0 g of the transparent beads are swollen in 200 ml ethylene dichloride and 450 ml anhydrous methanol, then stirred with 65.0 g trimethylamine. Water is slowly added to the mixture while the organic solvents are distilled out. The batch is cooled to give transparent beads of the following analysis:

| Total Solids | 55.4% |
|---|---|
| Anion Exchange Capacity | 3.90 me/gram |
| Strong Base Capacity | 3.63 me/gram |

EXAMPLE XIII

Copolymerization of Bis-(vinylbenzyl)-monomethylamine and Styrene Followed by Sulfonation 0.15 g of xanthan gum is dissolved in 50 ml of water. 12.0 g of a 0.17% aqueous solution of hydroxypropyl methylcellulose and 3.0 g of boric acid are dissolved in 126 g of water and the pH is adjusted to 10.3 with 50% NaOH. The xanthan gum solution and 40.0 g of NaCl are added, and the mixture is stirred under a positive pressure of nitrogen. To the aqueous phase, in the absence of stirring and under a positive pressure of nitrogen, is added a monomer mixture of 8.6 g of bis-(vinylbenzyl)monomethylamine, 80.0 g of styrene and 0.9 g of azobisisobutyronitrile. The resulting mixture is agitated at 185 rpm, and the batch is heated to 70° C. and maintained at this temperature for 4 hours. The batch is then heated at 95° C. for 1 hour, cooled, and the resulting beads separated, washed with water and dried. 77.3 g of the transparent beads are stirred with 500 ml of concentrated sulfuric acid and 25 ml of ethylene dichloride for 30 minutes. The batch is heated at 65° C. for 1 hour and 130° C. for 3 hours, while distilling out ethylene dichloride. The batch is cooled and water is added slowly at first so that the temperature does not rise above 90° C.

After washing several times with water, the black beads give the following analysis:

| Total Solids | 40.0% |
|---|---|
| Cation Exchange Capacity | 4.80 me/gram |
| Strong Acid Capacity | 4.48 me/gram |

EXAMPLE XIV

Copolymerization of Bis-(vinylbenzyl)-monomethylamine and Dimethylaminopropylmethacrylamide 0.03 g of gelatin is dissolved in 50 g of water. 0.1 g of sodium nitrite and 6.0 g of poly(sodium acrylate) solution/12.5% assay are dissolved in 150.0 g of water.

The gelatin solution and 86.0 g of sodium chloride are added, and the mixture is stirred under a positive pressure of nitrogen. To the aqueous phase, in the absence of stirring and under a positive pressure of nitrogen, is added a monomer mixture of 7.1 g of bis(vinylbenzyl)-monomethylamine, 80.0 g of dimethylaminopropylmethacrylamide, and 1.0 g of azobisisobutyronitrile. The resulting mixture is agitated at 176 rpm, and the batch is heated to 65° C. and maintained at this temperature for 4 hours. The batch is then heated at 95° C. for 1 hour, cooled, and the resulting beads separated and washed with water. The beads are then analyzed to give the following data:

| Total Solids | 34.0% |
|---|---|
| Anion Exchange Capacity | 5.53 me/gram |
| Strong Base Capacity | 0.74 me/gram |

Example XV

Copolymerization of Bis-(vinylbenzyl)-monomethylamine and Methyl Acrylate Followed by Amination 0.15 g of xanthan gum is dissolved in 50 ml of water. 12.0 g of a 0.17% aqueous solution of hydroxypropyl methylcellulose and 3.0 g of boric acid are dissolved in 126 g water and the pH is adjusted to 10.3 with 50% NaOH. The xanthan gum solution and 40.0 g of NaCl are added, and the mixture is stirred under a positive pressure of nitrogen. To the aqueous phase, in the absence of stirring and under a positive pressure of nitrogen, is added a monomer mixture of 8.6 g of bis-(vinylbenzyl)-monomethylamine, 80.0 g of methyl acrylate and 1.0 g of azobisisobutyronitrile. The resulting mixture is agitated at 170 rpm, and the batch is heated to 65° C. and maintained at this temperature for 4 hours. The batch is then heated at 95° C. for 1 hour, cooled, and the resulting beads separated, washed with water and dried. 77.0 g of the beads are stirred and heated with 175 ml of dimethylaminopropylamine and 350 ml of ethylene glycol. Methanol is distilled out until a pot temperature of 150° C. is achieved. The batch is stirred at 150° C. for 15 hours. On cooling, the beads are separated and washed several times with water. The beads are then analyzed to give the following data:

| Total Solids | 27.4% |
|---|---|
| Anion Exchange Capacity | 5.56 me/gram |
| Strong Base Capacity | 1.64 me/gram |

EXAMPLE XVI

Copolymerization of Bis-(vinylbenzyl)-dimethylammonium Chloride and Methacrylamidopropyltrimethylammonium Chloride An oil phase is prepared by dissolving 0.2 grams of an invert (oil-in-water) emulsifier in 1,2-dichloropropane. The reaction flask and stirred contents are then sparged with nitrogen for 15 minutes, and then the reaction flask is swept with a sufficient amount of nitrogen for the remainder of the reaction so as to maintain a positive pressure.

To the oil phase at 23° C., in the absence of agitation, is added a monomer phase of 72.0 grams of 50% aqueous methacrylamidopropyltrimethylammonium chloride and 14.0 grams of bis-(vinylbenzyl)-dimethylammonium chloride. The resulting mixture is then agitated at 126 rpm and is warmed to 30° C.

To this mixture is added an initiator phase of 2.0 ml. of 70% t-butyl hydroperoxide. The resulting stirred batch is heated at a temperature of 30° C. for 16 hours. The batch temperature is then raised to 40° C. and maintained for 40 minutes, and finally refluxed (78° C.) for 2 hours. Water is slowly added to the mixture while dichloropropane is distilled out until a pot temperature of 100° C. is achieved. The batch is cooled, then washed several times with water to give beads of the following analysis:

| Total Solids | 35.4% |
| Anion Exchange Capacity | 4.21 me/gram |
| Strong Base Capacity | 3.97 me/gram |

We claim:

1. A polymeric crosslinked nitrogenous poly-(vinylbenzyl) resin, selected from the group consisting of macroreticular and gel resins, polymerized from a monomer system comprising about 100% by weight, based on total amount of monomer, of a polymerizable bis-(vinylbenzyl) compound represented by the formula

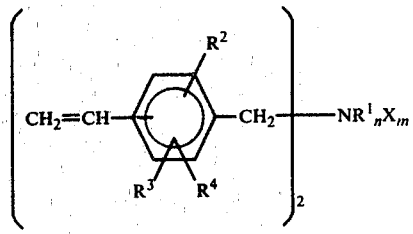

wherein:
$R^1$ is a $C_{1-16}$ alkyl, aryl, or aralkyl radical or a hydrogen radical;
$R^2$, $R^3$ and $R^4$ independently represent $C_{1-16}$ saturated or unsaturated hydrocarbyl, halogen, nitro, hydroxy, alkoxy, amino, or hydrogen radicals;
n is 1 or 2 wherein, if n is 2, each $R^1$ is independently selected;
X is an anion; and
m is 0 or 1 when n is 1 and 2, respectively.

2. The resin of claim 1 comprising a gel resin.

3. The resin of claim 2 comprising a homopolymer polymerized from bis-(vinylbenzyl)monomethylamine.

4. The resin of claim 1 comprising a macroreticular resin.

5. A polymeric crosslinked nitrogenous poly-(vinylbenzyl) gel resin polymerized from a monomer system comprising
(a) from about 0.1% to about 99.9% by weight, based on total monomer mixture, of a polymerizable bis-(vinylbenzyl) compound represented by the formula

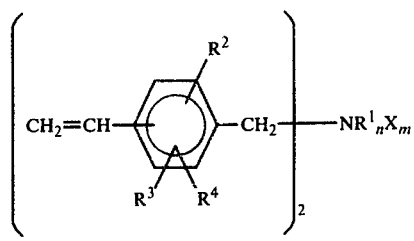

wherein:
$R^1$ is a $C_{1-16}$ alkyl, aryl, or aralkyl radical or a hydrogen radical;
$R^2$, $R^3$ and $R^4$ independently represent $C_{1-16}$ saturated or unsaturated hydrocarbyl, halogen, nitro, hydroxy, alkoxy, amino, or hydrogen radicals;
n is 1 or 2 wherein, if n is 2, each $R^1$ is independently selected;
X is an anion; and
m is 0 or 1 when n is 1 and 2 respectively; and
(b) from about 99.9% to about 0.1% by weight, based on total monomer mixture, of one or more copolymerizable monoethylenically unsaturated compounds selected from the group consisting of vinyl aromatic compounds, vinyl ethers, vinyl esters of carboxylic acids, vinyl halides, vinylidene halides, polymerizable alkenes and unsaturated carboxylic and dicarboxylic acids and derivatives thereof.

6. The resin of claim 5 wherein the copolymerizable monoethylenically unsaturated compounds are selected from the group consisting of mono-(vinylbenzyl) amines and ammonium salts thereof, vinylbenzyl chloride, styrenes and acrylic compounds including ester, nitrile, amide, and N-dialkylaminoalkyl and N-trialkylammoniumalkyl amide derivatives of acrylic and methacrylic acids.

7. The resin of claim 6 wherein the monomer system comprises from about 4% to about 70% by weight of the bis(vinylbenzyl) compound and from about 96% to about 30% by weight of one or more copolymerizable monoethylenically unsaturated compounds.

8. The resin of claim 7 wherein the monomer system comprises about 10% by weight of bis-(vinylbenzyl) monomethylamine and about 90% by weight of vinylbenzyldimethylamine.

9. The resin of claim 7 wherein the monomer system comprises about 70% of bis-(vinylbenzyl) dimethylammonium chloride and about 30% by weight of vinylbenzyltrimethylammonium methyl sulfate.

10. The resin of claim 6 wherein the monomer system comprises about 35% by weight of bis-(vinylbenzyl) dimethylammonium chloride and about 65% by weight of vinylbenzyltrimethylammonium hydroxide.

11. The resin of claim 6 wherein the monomer system comprises about 28% by weight of bis-(vinylbenzyl) dimethylammonium chloride and about 72% by weight of vinylbenzyltrimethylammonium hydroxide.

12. The resin of claim 6 wherein the monomer system comprises about 16% by weight of bis-(vinylbenzyl) monomethylamine and about 84% by weight of vinylbenzyl chloride.

13. The resin of claim 6 wherein the monomer system comprises about 10% by weight of bis-(vinylbenzyl) monomethylamine and about 90% by weight of styrene.

14. The resin of claim 6 wherein the monomer system comprises about 8% by weight of bis-(vinylbenzyl)

monomethylamine and about 92% by weight of dimethylaminopropylmethacrylamide.

15. The resin of claim 6 wherein the monomer system comprises about 10% by weight of bis-(vinylbenzyl) monomethylamine and about 90% by weight of methyl acrylate.

16. A polymeric crosslinked nitrogenous macroreticular resin polymerized from a monomer system comprising
(a) from about 0.1% to about 99.9% by weight, based on total monomer mixture, of a polymerizable bis-(vinylbenzyl) compound represented by the formula

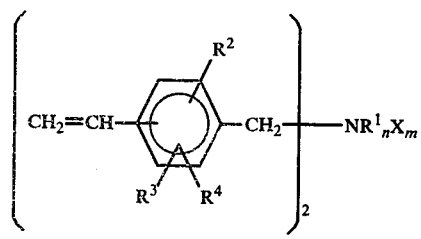 (I)

wherein:
$R^1$ is a $C_{1-16}$ alkyl, aryl, or aralkyl radical or a hydrogen radical;
$R^2$, $R^3$ and $R^4$ independently represent $C_{1-16}$ saturated or unsaturated hydrocarbyl, halogen, nitro, hydroxy, alkoxy, amino, or hydrogen radicals;
n is 1 or 2 wherein, if n is 2, each $R^1$ is independently selected;
X is an anion; and
m is 0 or 1 when n is 1 and 2, respectively; and
(b) from about 99.9% to about 0.1% by weight, based on total monomer mixture, of one or more copolymerizable monoethylenically unsaturated compounds selected from the group consisting of vinyl aromatic compounds, vinyl ethers, vinyl esters of carboxylic acids, vinyl halides, vinylidene halides, polymerizable alkenes and unsaturated carboxylic and dicarboxylic acids and derivatives thereof.

17. The resin of claim 16 wherein the copolymerizable monoethylenically unsaturated compounds are selected from the group consisting of monovinylbenzyl amines and ammonium salts thereof, vinylbenzyl chloride, styrenes, and acrylic compounds including ester, nitrile amide and N-dialkylaminoalkyl and N-trialkylammoniumalkyl amide derivatives of acrylic and methacrylic acids.

18. The resin of claim 17 wherein the monomer system comprises from about 4% to about 70% by weight of the bis-(vinylbenzyl) compound and from about 96% to about 30% by weight of one or more copolymerizable monoethylenically unsaturated compounds.

19. The resin of claim 17 wherein the monomer system comprises from about 4% to about 15% by weight of the bis-(vinylbenzyl) compound and from about 96% to about 85% by weight of one or more copolymerizable monoethylenically unsaturated compounds.

20. The resin of claim 17 wherein the monomer system comprises about 10% by weight of bis-(vinylbenzyl) monomethylamine and about 90% by weight of vinylbenzyldimethylamine.

21. A process for preparing the polymeric resin of claim 2 which comprises "suspension polymerizing" the monomer system in a buffered aqueous reaction medium containing a dispersant, agitating the resulting mixture in the presence of a catalyst capable of generating free radicals, and then heating the resulting mixture sufficiently to effect reactivity.

22. A process for preparing the polymeric resin of claim 4 which comprises "suspension polymerizing" the monomer system in a buffered aqueous reaction medium containing a dispersant, agitating the resulting mixture in the presence of a catalyst capable of generating free radicals and in the presence of from about 10% to about 70% of a phase extender, and then heating the resulting mixture sufficiently to effect reactivity.

23. The process of claim 22 wherein the phase extender is methyl isobutyl carbinol.

24. A process for preparing the polymeric resin of claim 5 which comprises "suspension polymerizing" the monomer system in a buffered aqueous reaction medium containing a dispersant, agitating the resulting mixture in the presence of a catalyst capable of generating free radicals and then heating the resulting mixture sufficiently to effect reactivity.

25. A process for preparing the polymeric resin of claim 16 which comprises "suspension polymerizing" the monomer system in a buffered aqueous reaction medium containing a dispersant, agitating the resulting mixture in the presence of a catalyst capable of generating free radicals, and in the presence of from about 10% to about 70% of a phase extender, and then heating the resulting mixture sufficiently to effect reactivity.

* * * * *